(12) United States Patent
Thakkar et al.

(10) Patent No.: US 8,453,140 B2
(45) Date of Patent: May 28, 2013

(54) METHOD FOR GENERICALLY HANDLING CARRIER SPECIFIC PROVISIONING FOR COMPUTER CELLULAR WIRELESS CARDS

(75) Inventors: Samir Thakkar, San Diego, CA (US); John Geoffrey Rogers, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1065 days.

(21) Appl. No.: 12/431,050

(22) Filed: Apr. 28, 2009

(65) Prior Publication Data

US 2010/0274930 A1 Oct. 28, 2010

(51) Int. Cl.
*G06F 9/44* (2006.01)
*H04M 1/00* (2006.01)

(52) U.S. Cl.
USPC .............................. 717/172; 455/558; 717/178

(58) Field of Classification Search
USPC .......................................................... 717/170
See application file for complete search history.

(56) References Cited

U.S. PATENT DOCUMENTS

| | | | |
|---|---|---|---|
| 5,734,487 A | 3/1998 | Rossi | |
| 5,887,254 A * | 3/1999 | Halonen | 455/419 |
| 6,829,222 B2 | 12/2004 | Amis et al. | |
| 6,876,295 B1 * | 4/2005 | Lewis | 340/10.34 |
| 6,975,632 B2 | 12/2005 | Deo et al. | |
| 6,978,453 B2 | 12/2005 | Rao et al. | |
| 7,200,390 B1 | 4/2007 | Henager et al. | |
| 7,305,090 B1 | 12/2007 | Hayes et al. | |
| 7,461,374 B1 | 12/2008 | Balint et al. | |
| 7,516,206 B2 | 4/2009 | Henseler et al. | |
| 7,565,650 B2 * | 7/2009 | Bhogal | 717/178 |
| 7,769,371 B1 | 8/2010 | Lamb et al. | |
| 8,150,425 B1 * | 4/2012 | Soelberg et al. | 455/466 |
| 2004/0018853 A1 | 1/2004 | Lewis | |
| 2004/0031030 A1 * | 2/2004 | Kidder et al. | 717/172 |
| 2004/0230965 A1 | 11/2004 | Okkonen | |

(Continued)

FOREIGN PATENT DOCUMENTS

| | | |
|---|---|---|
| DE | 19543843 A1 | 5/1997 |
| EP | 1085395 A2 | 3/2001 |

(Continued)

OTHER PUBLICATIONS

International Search Report and Written Opinion—PCT/US2010/032758, International Search Authority—European Patent Office—Aug. 3, 2010.

*Primary Examiner* — Don Wong
*Assistant Examiner* — Mohammad Kabir
(74) *Attorney, Agent, or Firm* — James T. Hagler

(57) ABSTRACT

Methods and systems enable computers to be equipped and provisioned to access any cellular network without the need for carrier-specific inventory or point-of sale provisioning of the cellular network transceiver. Multiple digitally signed provisioning data images for multiple carriers are stored on the computer's hard disk memory prior to sale. Upon initialization, provisioning data for a selected carrier are downloaded to random access memory of the cellular network data transceiver from the hard disk. A version number within the provisioning data is compared to a version number of provisioning information stored in the transceiver's nonvolatile memory. If the downloaded provisioning data is newer than that stored in nonvolatile memory, the downloaded provisioning data is stored in the nonvolatile memory. The random access memory is cleared of the downloaded provisioning data and initialization of the transceiver is begun. Updated provisioning information can be received and stored to the hard disk.

15 Claims, 9 Drawing Sheets

U.S. PATENT DOCUMENTS

| | | |
|---|---|---|
| 2004/0237081 A1 | 11/2004 | Homiller |
| 2005/0010916 A1 | 1/2005 | Hagen et al. |
| 2005/0054336 A1 | 3/2005 | Sanding |
| 2005/0055689 A1 | 3/2005 | Abfalter et al. |
| 2006/0203722 A1 | 9/2006 | Oommen |
| 2006/0221918 A1 | 10/2006 | Wang |
| 2006/0277539 A1 | 12/2006 | Amarasinghe et al. |
| 2007/0129078 A1 | 6/2007 | De Beer |
| 2008/0177994 A1* | 7/2008 | Mayer ............... 713/2 |
| 2008/0266595 A1* | 10/2008 | Wright et al. ........ 358/1.15 |
| 2009/0075698 A1* | 3/2009 | Ding et al. ............ 455/558 |
| 2009/0100420 A1 | 4/2009 | Sapuntzakis et al. |
| 2009/0196268 A1 | 8/2009 | Caldwell et al. |
| 2009/0215449 A1 | 8/2009 | Avner |
| 2010/0179991 A1* | 7/2010 | Lorch et al. ........... 709/206 |
| 2010/0182163 A1 | 7/2010 | Rennie et al. |
| 2010/0291898 A1 | 11/2010 | Sanding et al. |
| 2010/0291910 A1 | 11/2010 | Sanding et al. |
| 2011/0010543 A1 | 1/2011 | Schmidt et al. |
| 2011/0035741 A1 | 2/2011 | Thiyagarajan |
| 2011/0191572 A1 | 8/2011 | Taylor et al. |
| 2011/0191844 A1 | 8/2011 | Bogineni et al. |
| 2011/0296399 A1 | 12/2011 | Tugnawat et al. |

FOREIGN PATENT DOCUMENTS

| | | |
|---|---|---|
| EP | 1473845 A1 | 11/2004 |
| EP | 1551107 | 7/2005 |
| EP | 1761088 A1 | 3/2007 |
| GB | 2292047 A | 2/1996 |
| WO | 9317512 A1 | 9/1993 |

* cited by examiner

METHOD FOR GENERICALLY HANDLING CARRIER SPECIFIC PROVISIONING FOR COMPUTER CELLULAR WIRELESS CARDS

FIELD OF THE INVENTION

The present invention relates to wireless telecommunications, and more particularly to methods for provisioning cellular network transceivers installed in computer systems.

BACKGROUND

Increasingly, personal computers, particularly laptop computers, are sold preloaded with networking hardware and software. Typically, new laptop computers are sold preprovisioned with all of the hardware necessary to connect to the Internet right out of the box.

Another recent marketing trend is to provide laptop computers with wireless network capabilities, including wireless (WiFi) network cards (e.g., IEEE 802.11(g)). Eventually, laptop computers may come provisioned with cellular network transceivers. While WiFi-type wireless network cards are easily implemented because their communication protocol is standardized, this is not true for cellular wireless data networks. Instead, a number of competing cellular technologies are currently deployed by a variety of cellular service providers. Also, the various cellular service providers require the use of carrier-specific technical settings in order to access to their networks. Further, each cellular carrier has its own preferred roaming list (PRL) which must be loaded to the cellular network transceiver in order to be able to access the carrier's network.

This variety of technical settings required for cellular wireless modem cards complicates the manufacture and sale of laptop computers. One solution is to sell laptop computers specifically configured for particular carriers. However, this approach creates inventory challenges as an inventory of laptops must be provisioned and stocked for each cellular carrier even though the only difference between laptops is a small amount of cellular provisioning information stored on the cellular wireless modem card. Since it is not possible to know in advance which carriers will attract more consumers, retailers must maintain excess inventory. Alternatively, consumers may be required to visit a cellular carrier's store to have the cellular wireless card activated (i.e., programmed with provisioning data). However, this extra step is likely to generate consumer dissatisfaction. Both alternatives will also require the consumer to bring the laptop computer into a carrier's store in order to switch to a new carrier.

SUMMARY

The various embodiments provide methods and systems for pre-provisioning a computer with a cellular network transceiver and cellular provisioning data to enable the computer to access any cellular network without the need for carrier-specific inventory or point-of sale provisioning of the transceiver. Multiple digitally signed provisioning data images for multiple carriers may be stored on the computer's hard disk memory prior to delivery to a consumer. Upon initialization, provisioning data for a selected carrier are downloaded to random access memory of the cellular network data transceiver from the hard disk. A version value or number within the provisioning data is compared to a version value or number of provisioning information stored in the transceiver's nonvolatile memory. If the downloaded provisioning data is newer than that stored in nonvolatile memory, the downloaded provisioning data is stored in the nonvolatile memory. The random access memory can then be cleared of the downloaded provisioning data. Initialization of the transceiver can then be initiated. Updated provisioning information can be received and stored to the hard disk.

BRIEF DESCRIPTION OF THE DRAWINGS

The disclosed aspects will hereinafter be described in conjunction with the appended drawings, provided to illustrate and not to limit the disclosed aspects, wherein like designations denote the elements.

DETAILED DESCRIPTION

Figure 1:
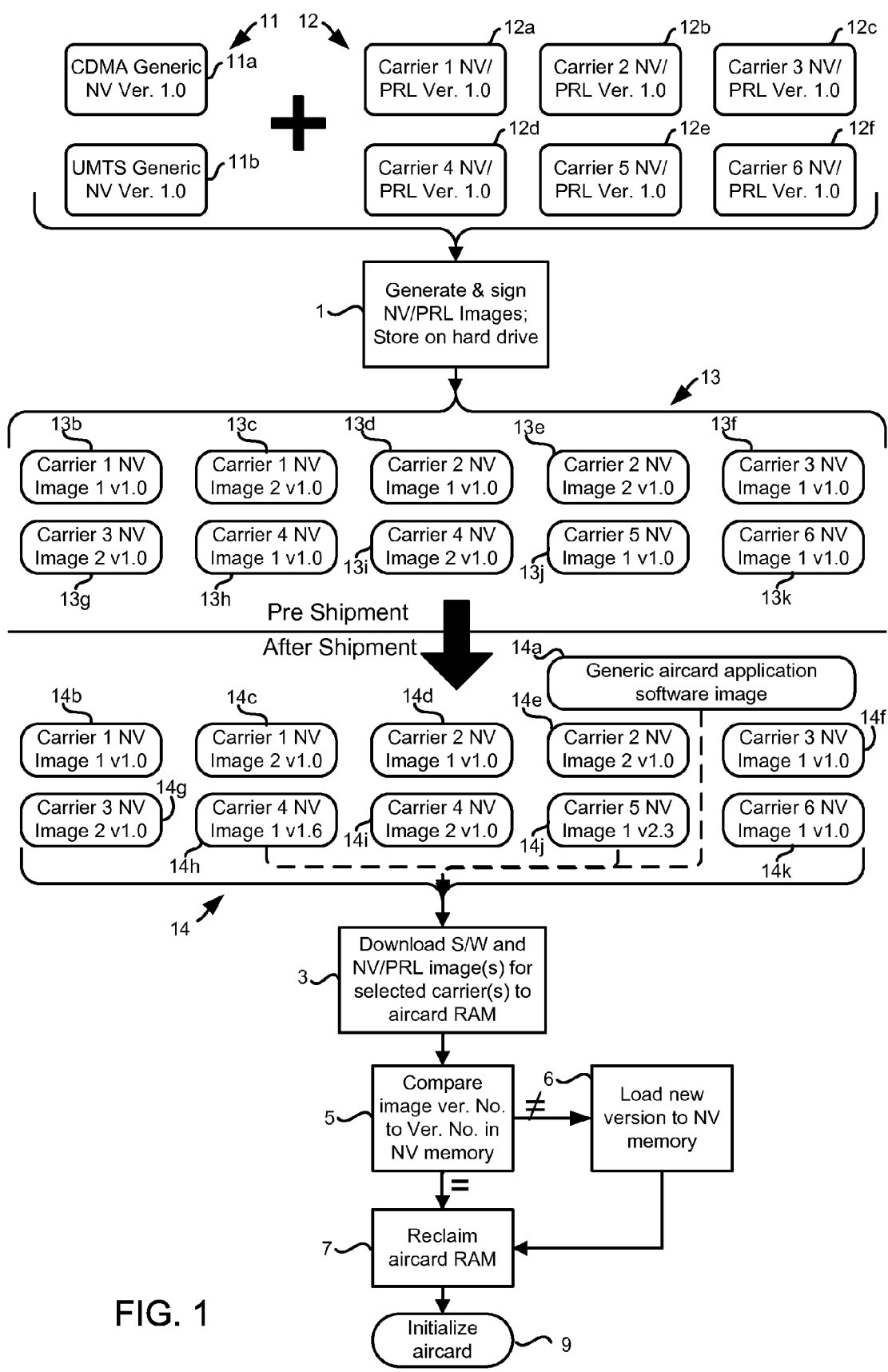
FIG. 1 is a process flow diagram of a method for provisioning laptop computers with cellular data transceiver provisioning information that can be implemented after the point-of-sale according to an embodiment.

The present systems, devices, apparatus, methods, and machine-readable medium will be described in more detail hereinafter with reference to the accompanying drawings, in which aspects of the invention are shown. The systems, devices, apparatus, methods, and machine-readable medium, however, may be embodied in many different forms and should not be construed as limited to the aspects set forth herein; rather, the present aspects are provided so that the subject disclosure will be thorough and complete, and will convey the scope of the invention to those skilled in the art. Like numbers refer to like elements throughout.

As used herein, the terms "computer" and "laptop computer" refer to any computing device employing a cellular network transceiver/modem, including one or all of laptop computers, desktop computers, palm-top computers, cellular telephones, personal data assistants (PDA's), wireless electronic mail receivers (e.g., the Blackberry® and Treo® devices), multimedia Internet enabled cellular telephones (e.g., the iPhone®), and similar personal electronic devices which include a programmable processor and memory and may be used to connect to a cellular data network.

Computer manufacturers, particularly manufacturers of laptop computers, are moving towards offering fully integrated computer systems which include all the necessary circuit boards and software to connect to the Internet "out-of-the-box." Thus, most laptop computers now come equipped with a WiFi transceiver modem card and minimal software for connecting to a WiFi wireless network. It is expected that computers will soon also come equipped with cellular network data transceivers which can connect computers to cellular telephone networks. Since cellular network coverage is much more extensive than that of WiFi networks, cellular data network transceivers enable computers to connect to the Internet from nearly any location. As such, it is expected that computers, particularly laptop computers, with built-in cellular data network transceivers will be popular with consumers.

Equipping computers with cellular network transceivers in the factory poses unique configuration challenges not faced with other computer equipment. This is because cellular data network transceivers must be provisioned with special data that is unique to particular cellular system carriers. Since most cellular providers employ closed systems, in which access to their network is controlled by provisioning data which is tightly controlled by the carriers, most cellular network data transceivers must be programmed by a particular carrier before it can be used. Thus, historically, cellular carriers sold plug-in cards (such as PCMCIA card modems) as part of their data network offering. In order to gain access to the cellular data network of a particular carrier, a consumer had to purchase a transceiver card from the carrier. If a consumer chose to switch carriers, the consumer had to purchase a different transceiver card from the new carrier. The new modem transceiver would include the provisioning data necessary to access the new carrier's network.

When cellular network transceivers are provided as part of the computer's initial hardware, manufacturers face a difficult choice for provisioning such hardware to be network-ready. Without the proper provisioning data, a cellular network data transceiver cannot access the carrier's network, and thus is not able to access the Internet "out-of-the-box."

One solution is for manufacturers to provision computers in the factory for particular carriers. This solution requires producing a unique model computer for each cellular carrier so that consumers can choose the cellular carrier at the time they purchase the computer. This solution poses disadvantages for manufacturers and retailers, since they must produce and stock sufficient computers in each variety (i.e., computers for each carrier). Thus, manufacturers and retailers may need to stock a minimum number of computers for each of the variety of cellular carriers available in each market, even though the difference between these different varieties is limited to a small amount of digital data. As a result, manufacturers and retailers may need to maintain more inventory than otherwise would be required to meet consumer demand.

Another solution is to leave the provisioning step to the consumer. In this solution, a consumer may purchase a computer including a cellular network transceiver but not be able to use it until the consumer has the transceiver provisioned by a particular carrier. This may be done by bringing the computer, such as a laptop computer, to a store where the carrier provisions and services cell phones. There, the carrier can load the provisioning data to the computer's cellular network transceiver, storing the information in nonvolatile memory. This solution is undesirable for consumers since an additional step is required to activate their computer.

The provisioning information that needs to be loaded onto a cellular network transceiver includes information needed by the transceiver to access the network, identifiers to be transmitted by the transceiver to the network, and information to enable the transceiver to connect to cellular networks no matter where they are located. In particular, the transceiver needs to be informed of the frequencies and access codes for connecting to a particular carrier's network. Also, the transceiver needs to be programmed with identification codes that it will transmit to the carrier's network so that the carrier will recognize the transceiver as authorized to access the network. The provisioning information will also include data known as the Preferred Roaming List (PRL), which is a set of carriers and network access frequencies to be used when the primary network is unavailable. In addition to such subscription related data, the provisioning information may also include feature flags and definitions that activate features and applications on the transceiver by setting particular variables to specific values. For example, one carrier may choose to support a particular optional feature in the 3G standard, and does so by setting associated flags and data values in the provisioning. A second carrier that chooses not to support that optional feature commercial reasons would include in its provisioning data a different set of flags and data associated with this feature.

Provisioning information is typically stored in nonvolatile (NV) memory, such as flash memory, on the transceiver circuit board. This ensures that the essential provisioning information is available to the transceiver for connecting to the network. Additionally, the PRL is frequently stored in NV memory. As such, the provisioning information (including a provisioning data image) is also referred to herein as the NV/PRL data.

In addition to the carrier's unique provisioning information, cellular networks employ different technologies, including in particular Code Division Multiple Access (CDMA) and the Universal Mobile Telecommunications Service (UMTS) technologies. While a single cellular network data transceiver can be designed with circuitry enabling it to connect to either a CDMA or UMTS technology network, these different technologies require different provisioning data even when the same carrier is supporting both network technologies.

Strict control of the transceiver provisioning information is driven by a number of practical requirements. First, cellular network carriers have made significant investments in their networks and compete on the basis of service, and thus have economic reasons for limiting access to their networks. For example, cellular carriers negotiate with other carriers outside their region to accept data calls when the transceiver is "roaming" and ensures that consumers implement the negotiated carriers in a priority will order using the PRL information provisioned on their transceivers. Second, if the public has open access to provisioning information, such as if provisioning information is provided as software loadable from a tangible medium (such as a compact disc) or downloadable from an Internet website, the information may be manipulated by unauthorized parties for improper purposes. Third, network carriers want to ensure the reliability of their networks, which begins by ensuring the integrity of the provisioning data used by the transceiver in accessing the network.

Various embodiments provide methods to enable computers, such as laptop computers, to be equipped and provisioned to access any cellular network worldwide without the need for carrier-specific inventory or consumers having to visit carriers, while providing security for the associated provisioning information. The methods can be used to provision cellular network data transceivers capable of accessing both CDMA and GSM networks. The embodiments provide consumers with control over their choice of networks, including the ability to switch cellular carriers without having to bring their computer into a carrier's office. Further, various embodiments enable carriers to update their provisioning information in a variety of ways while leaving the consumer the freedom of changing carriers at will.

FIG. 1 illustrates the overall processing of various embodiments as may be implemented by a computer manufacturer. During manufacture and assembly, at least before the computer is delivered to a consumer, a plurality of provisioning data images are created and stored on the computer's hard drive, step 1. In generating the provisioning data images, a computer may be employed to combine generic provisioning information associated with each cellular technology (e.g., CDMA and UMTS) with provisioning information needed to access a particular carrier's network. For example, a generic CDMA provisioning data set 11*a* may be used to generate provisioning data images for the CDMA cellular networks. Similarly, a generic UMTS provisioning data set 11*b* may be used to generate the provisioning data sets for use with UMTS networks. Similarly, each carrier may provide a set of provisioning data that needs to be combined with the particular technology provisioning information in order to generate a complete technology/carrier-specific provisioning data set. Thus, a first carrier may have a proprietary provisioning data set 12*a* while a second carrier has a different provisioning data set 12*b*. A carrier may also provide carrier/technology-specific provisioning data sets that should be used in creating specific provisioning data set. As illustrated in FIG. 1, there may be many different carrier provisioning data sets, including as many carriers as there are in a country or even worldwide.

The generic technology provisioning data sets 11 are combined with the various carrier-specific provisioning data sets 12 to generate the carrier and technology specific provisioning data images 13, step 1. Other information and software required to operate the cellular network transceiver may also be combined at this stage to create data images necessary to operate the transceiver "out of the box."

For security reasons, each provisioning data image will typically be digitally signed in step 1 using a cryptographic signature as is well known in the computer and cellular technology arts. Such generated and signed provisioning data images 13 may then be stored on a server or remote database that can be used while assembling and provisioning computers (or their hard disk drives) on the assembly line or at a point of distribution. Further, the generated and signed provisioning data images may be stored at any location and downloaded via the Internet or other network at a location where computer hard drives are formatted and loaded with initial software.

In this manner computers can be delivered to customers with the hard disk preloaded with provisioning data set images 13 sufficient to enable connecting to the Internet (or other networks) via a cellular data network "out of the box." As noted above, this loading of the provisioning data images 13 (i.e., images 13*b*-13*k*) onto the computer's hard drive may be accomplished during manufacture, at a point of distribution, or at the point-of-sale. Further, the provisioning data images 13 (i.e., images 13*b*-13*k*) may be loaded on hard drives before they are assembled into computers. Provisioning data images 13 may be provided for every carrier worldwide or for those carriers within a particular region or country of distribution (i.e. carriers in a country where the computer is likely to be sold).

With the various embodiments, when a consumer receives a new computer, it can be equipped with a full set of provisioning data images 14 required to connect to any carrier's cellular network within a region of distribution. The preloaded provisioning data images 14 may also include a transceiver operating software application 14*a* (generic or by a particular software vendor) for operating the cellular network transceiver, as well as a carrier/technology specific provisioning data images 14*b*-14*k*.

When the new computer is started for the first time it cannot access a cellular data network until the appropriate provisioning data has been loaded into the cellular network transceiver's nonvolatile memory. Thus, various embodiments include method steps for downloading an appropriate provisioning data image to the transceiver prior to beginning other steps of initializing the transceiver.

It is anticipated that a provisioning data image will be downloaded to the cellular network transceiver for a selected carrier as well as the selected cellular technology type. For example, if the consumer chooses to connect to a cellular data network using CDMA technology, then the computer may be configured by user selections to download the provisioned data image 14*h* for a particular CDMA carrier whenever the cellular network transceiver is initialized, step 3. It is anticipated that the cellular transceiver card may be capable of operating using either CDMA or UMTS technologies. Accordingly, the transceiver card may also be loaded with a provisioning data image associated with the other cellular technology. As illustrated in FIG. 1, a consumer may select a different carrier to provide network services for each technology, such as image 14*j* for a UMTS network. This capability may allow consumers to select a first carrier and first technology for receiving cellular network service in the United States and a different carrier and different technology for accessing cellular networks in Europe. As part of the software download, the cellular transceiver operating software application 14*a* may also be downloaded in step 3.

In order for the computer to load the appropriate carrier-specific provisioning data image, the computer will provide the consumer with an opportunity to select a particular carrier from a plurality of carriers when the cellular network transceiver is first initialized. Since the provisioning data images for several carriers and technologies are stored on the hard drive prior to delivery to consumers, this selection can be made without the need to visit particular carrier stores or download additional provisioning data from the Internet. Once the consumer has selected particular carriers and technology types, these selections are recorded in the computer's memory (e.g., in the computer's system configuration settings) and the selection process does not need to be repeated unless the consumer chooses to switch carriers at a later time.

Typically, cellular carriers revise their provisioning information from time to time. For example, the provisioning PRL list may be changed when the carrier negotiates a different set of roaming agreements with other carriers. Also, carriers may update their provisioning data in order to address changes in security or network configurations. Accordingly, the various embodiments provide the ability to update the provisioning data images stored on the hard drive and for ensuring that the most recent version of each is loaded into the cellular network transceiver.

After the software and provisioning data images for the selected carriers have been downloaded to the random access memory (RAM) of the transceiver, step 3, the transceiver verifies the integrity of the software and provisioning data images, and checks the version of the provisioning information data images loaded in RAM against the version of provisioning data already loaded in the transceiver's nonvolatile memory, step 5. If the version of the provisioning data image stored in RAM is newer than that loaded in the transceiver's nonvolatile memory, then the version in RAM is loaded into the nonvolatile memory, step 6. If the version of the provisioning information is the same or older than that which is stored in the transceiver's nonvolatile memory, then the downloaded provisioning data image in RAM is deleted in order to recover memory space for use by applications.

In an embodiment, the individual provisioning data images 14 may be stored on the computer's hard drive in a hidden and/or encrypted format. In this manner, the data images are protected from tampering and misappropriation while stored on the hard drive. Once downloaded to the cellular network transceiver, a processor on the transceiver may decrypt the provisioning data image as part of loading the provisioning data into flash memory, step 6. In this manner, the provisioning data image can be maintained in an encrypted format until it is uploaded to the nonvolatile memory from which the transceiver will operate.

In another embodiment, the provisioning data images 14 may be stored in locations on the hard drive and in formats which make them inaccessible by users. Storing the provisioning data sets in such a format protects them from misappropriation or tampering by users which could disclose carrier proprietary information or render the data sets inoperable. In a further embodiment, the provisioning data images may be both encrypted and stored as inaccessible files on the computer hard drive.

During the process of generating and signing a provisioning data image, a version number is included as part of the data image. This version number may be a simple index number or time stamp value as described below with reference to FIG. 5. This version number is included within the provisioning data image to enable the cellular network transceiver to determine the version of the entire provisioning data image.

Once the consumer has selected a carrier and downloaded the carrier's provisioning data image, step 3, and the selected provisioning data image has been loaded to the transceivers nonvolatile memory, step 6, the cellular network transceiver can access the selected carrier's network. At that point, the carrier may prompt the cellular network transceiver to report the version number of the provisioning data that it is using. If the provisioning data version loaded on the transceiver is not the most current version, the cellular carrier may initiate a download of an updated provisioning data image to the transceiver for storage on the computer's hard drive. An example of such a method is described below with reference to FIG. 9. In this manner, the carrier can ensure that the provisioning data used by the transceiver and stored on the consumer's computer is the latest version. This is illustrated in FIG. 1 where carrier provisioning data image 1 is version no. 1.6, indicating that the image 14h has been updated. Similarly, the carrier 5 provisioning data image 1 is version 2.3. In addition or as an alternative to over the air downloading of updated provisioning data images, updated provisioning information may also be provided via the Internet or on tangible media such as a compact disk (CD). Thus, if a user decides to change carriers, the consumer may download an updated provisioning data image at the time that consumer signs the carrier service agreement. The provisioning data image may be provided as part of the sign up package, or may be a downloaded from the Internet at that time or just prior to activating a new service agreement.

While not required as part of this invention, some carriers may choose to store a basic provisioning data image on new computers which will enable a consumer to contact the network "out of the box," and then download an updated and fully implemented provisioning data image for storage on the hard drive. In this manner, a minimal provisioning data set may be stored on the computer prior to shipment. Using the minimal provisioning data, consumers are then able to contact the selected cellular carrier network, and at that point download a fully updated provisioning data image for storage on the hard drive.

The various embodiments provide for downloading of updated provisioning data images so that the cellular network transceiver can immediately switch to implementing the most up to date image. An example of such methods is discussed below with reference to FIG. 9.

Figure 2:
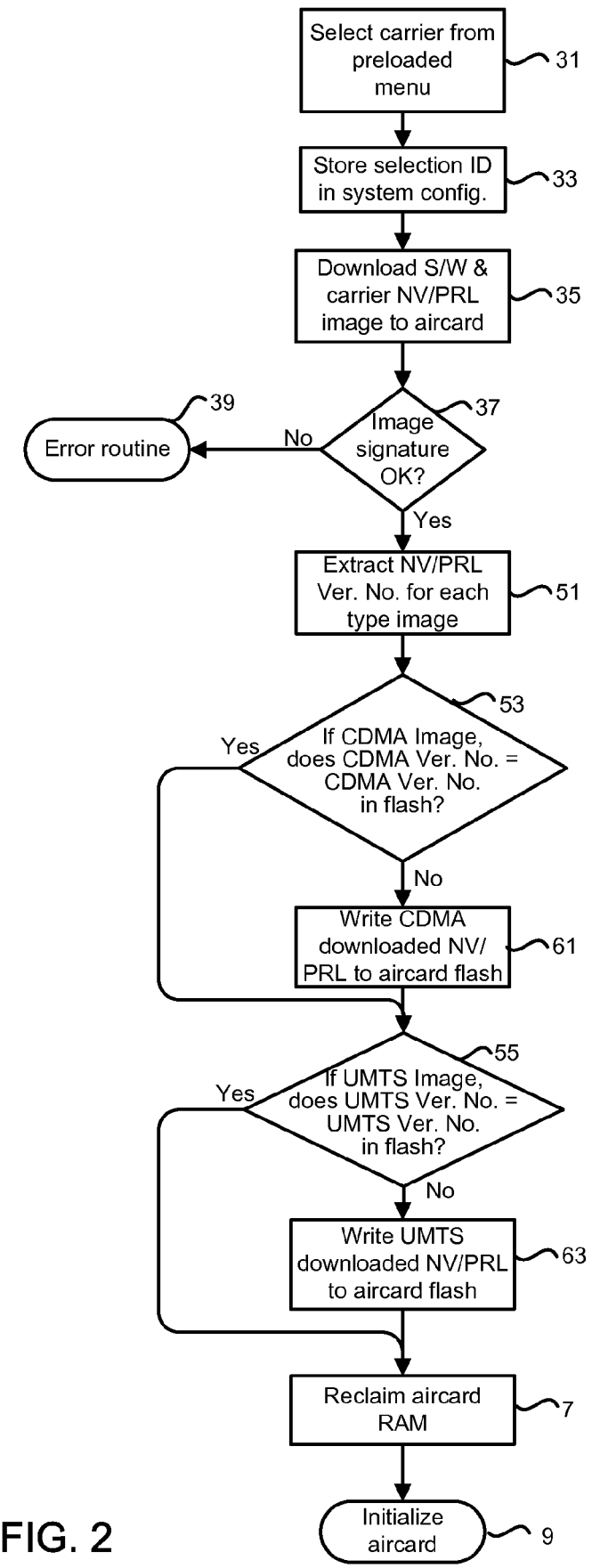
FIG. 2 is a process flow diagram of an embodiment method for initial loading of provisioning information into a cellular network transceiver.

Some of the method steps for loading provisioning data to a cellular network transceiver are illustrated in FIG. 2. The first time that a cellular network transceiver is activated on new computer, initial setup software may load a menu application to prompt the user to make a network carrier selection. This may be included as part of a transceiver setup application that initially sets options for operating the transceiver. In response to such a menu, the user selects a carrier and technology from a pre-loaded menu lists, step 31. In response to the user's selection, the initialization application can store the carrier selection information, such as an identifier (ID) of the carrier, in the computer system configuration information, step 33. In this manner, the carrier selection need only be made once by the user, with subsequent startups implementing the user's selection by accessing the system configuration information.

Using a user's carrier selection or the carrier selection information stored within the system configuration, the computer can select the appropriate provisioning data image to download from the computer's hard drive, step 35. As part of this step, transceiver operating software may also be downloaded to the transceiver RAM.

When the software and provisioning data image have been downloaded to the transceiver's RAM, the transceiver processor needs to confirm that the software and data are valid and has not been tampered with. This may be accomplished by verifying the digital signature attached to the software and the provisioning data set. Such digital signature verification of software is typical in cellular telephone applications, and ensures that only verified safe software applications are implemented. Methods for digitally signing application software and data sets are well known in the cell phone technology arts. In general, these methods involve creating a cryptographic hash of the software code and data records using an encryption key. To verify the signature, the transceiver processor performs a same or similar hash algorithm on the downloaded software and data, compares the resulting hash value to the signature appended to the software. If the two values match, this indicates that there has been no changes to the software and/or data since the signing authority verified the software and/or image(s) and attached the digital signature. This process can be accomplished on both the transceiver applications software and the downloaded provisioning data image(s) in step 37.

Figure 4:
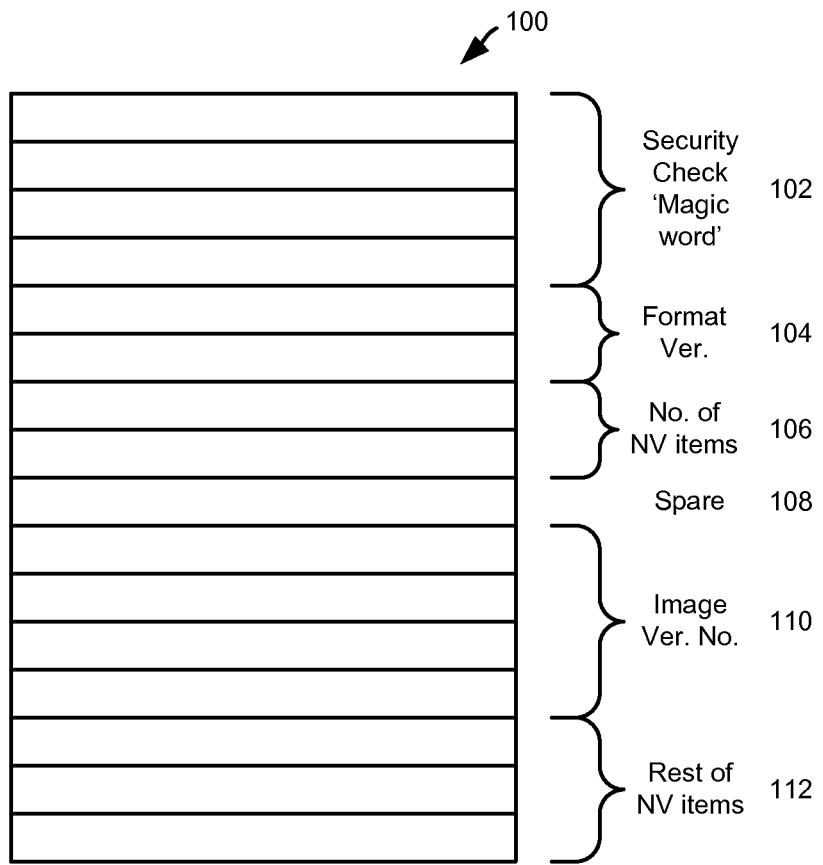
FIG. 4 is a data structure diagram of provisioning data according to an embodiment.
Figure 5:
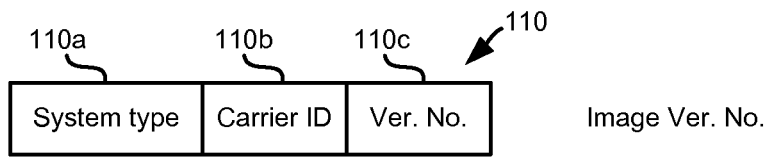
FIG. 5 is a data structure diagram of a provisioning image version number or value according to an embodiment.

If either the software or the provisioning data image(s) fails the signature verification step 37, and error routine is initiated, step 39. However, if the signature verification step 37 is successful, cellular network transceiver will obtain the version number of each type of provisioning data image, step 51, and compare each image type (e.g., CDMA or UMTS) version number to the corresponding type version number stored in the transceiver's nonvolatile memory, steps 53 and 55. The version number can be obtained by parsing the provisioning data image to obtain the version number data field, such as illustrated in FIGS. 4 and 5. This downloaded image version number then can be compared to a version number that is stored in the nonvolatile memory of the transceiver. The stored version number indicates the version of the provisioning data that is stored in nonvolatile memory.

The version number need not be a number per se, and instead can be any value used to indicate the version or generation of the provisioning data image. For example, the version number may be a date stamp hub the day that the provisioning data image has been verified and signed with a digital signature. As another example, the version number may be a sequence number that is incremented with each new version. The version number also may be alphanumeric or a combination of letters and numbers. References herein and in the claims to "number" are intended to encompass all forms of digital data that may be used to indicate a version of the data, including numbers, letters and combinations of numbers and letters.

The step of comparing the version number of downloaded provisioning data images can be performed for each type of technology data image stored in nonvolatile memory. Thus, the process may be repeated for CDMA and UMTS provisioning data images. Thus, in step 51, the transceiver may extract two or more version numbers, one for each technology provisioning data image downloaded. The transceiver then compares the version number of each downloaded provisioning data image with the version number of the corresponding type of provisioning data stored in the transceivers nonvolatile memory.

In the preferred embodiment example illustrated in FIG. 2, the transceiver compares the version number of a CDMA provisioning data image to the version number of CDMA provisioning data stored in nonvolatile memory, step 53. If the version number of the downloaded CDMA provisioning data image is newer than the CDMA version number of the provisioning data stored in nonvolatile memory (i.e., test 53="No" indicating that the image is a CDMA image and the CDMA version numbers are not equal), the downloaded provisioning data image is stored in the nonvolatile memory, step 61. As part of this process, the new CDMA version number is also stored in nonvolatile memory in a location where it can be readily accessed for the purpose of comparing version numbers. In some implementations, the transceiver may decrypt the provisioning data within the provisioning data image in order to be able to store non-encrypted provisioning data in the nonvolatile memory. The transceiver may also reconfigure or rearrange the provisioning data before storing it in nonvolatile memory.

The process of comparing the version number of the downloaded provisioning data image with the version number of provisioning data stored in non-volatile memory is repeated for each technology supported by the transceiver. In the preferred embodiment example illustrated in FIG. 2, the transceiver compares the version number of a UMTS provisioning data image to the version number of the UMTS provisioning data stored in nonvolatile memory, step 55. If the version number of the downloaded UMTS provisioning data image is newer than the version number of the UMTS provisioning data stored in nonvolatile memory (i.e., test 55="No" indicating that the image is a UMTS image and the UMTS version numbers are not equal), the downloaded UMTS provisioning data is stored in the nonvolatile memory, step 63.

Once the new provisioning data images have been loaded to nonvolatile memory, step 61 and 63, downloaded provisioning data images are deleted from the transceiver's RAM in order to reclaim the memory space for use with other applications, step 7. Finally, the method can proceed to the process of initializing the transceiver for operation, step 9. By accomplishing the steps of confirming the provisioning data image version number and loading more recent provisioning data to nonvolatile memory before the transceiver is otherwise initialized enables the provisioning step to be accomplished without the need to reboot or reinitialize the transceiver.

Figure 3:
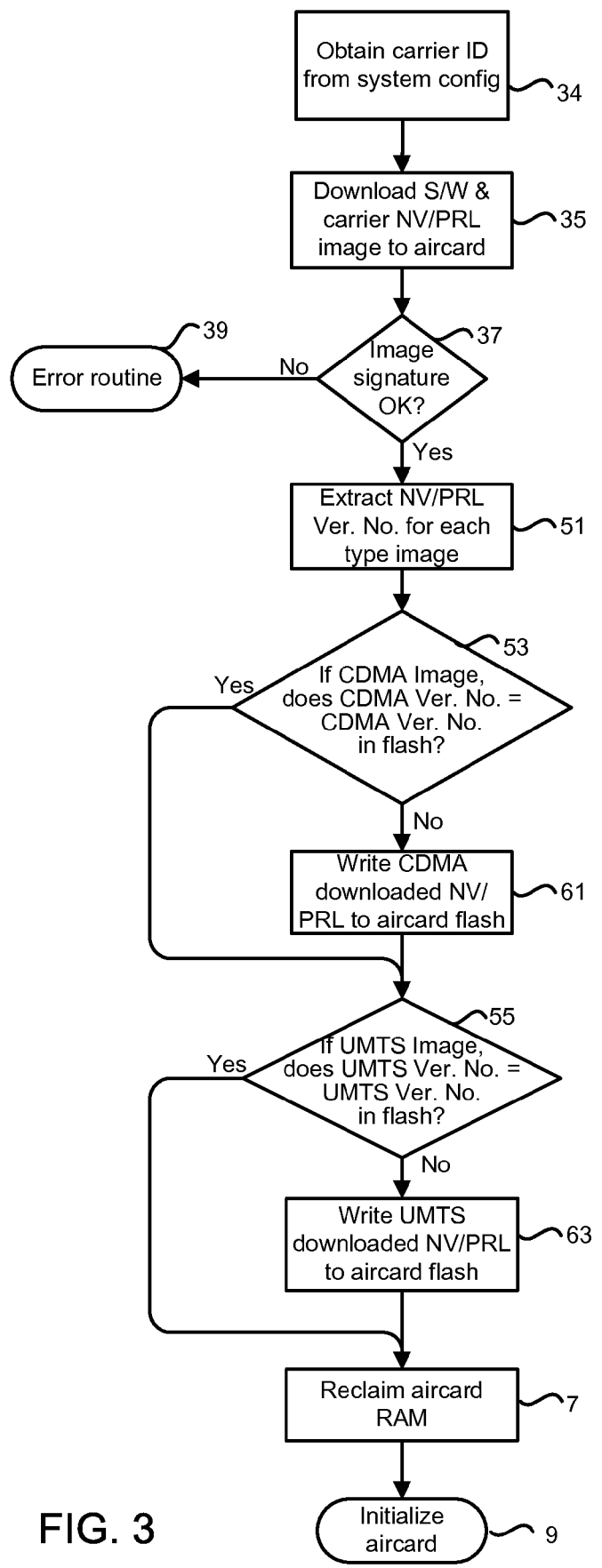
FIG. 3 is a process flow diagram of an embodiment method for subsequent loading of provisioning information into a cellular network transceiver.

FIG. 3 illustrates method steps that may be implemented during subsequent initializations of the cellular network transceiver. After the first time the cellular network transceiver has been operated, the user's carrier selections may be obtained from the computer's system configuration settings, so that the process can move immediately to loading software to the transceiver. To do this, the transceiver may receive the carrier ID or other indicator of the selected carrier from the computer system configuration information, step 34. Using this information, the computer can download to the transceiver the selected carrier provisioning data image, step 35. This information is downloaded into the transceiver's RAM.

Before the transceiver software is loaded into the transceiver's processor the provisioning data image version numbers are checked, the downloaded software and data image are verified using the digital signature attached to the software and provisioning data images by an authenticating agency, step 37. As discussed above with reference to FIG. 2, methods for verifying software and data using digital signatures are well known in the cellular telephone technology arts. If either the software or provisioning data image signatures is not validated, an error routine may be implemented, step 39.

If the software and provisioning data image signatures are verified then the cellular network transceiver processor extracts the version number from the provisioning data image for each technology type, step 51. As described above with reference to FIG. 2, in a preferred embodiment if the version number of the downloaded CDMA provisioning data is later than the version number of the CDMA provisioning data stored in nonvolatile memory (i.e., test 53="No" indicating that the image is a CDMA image and the CDMA version numbers are not equal), then provisioning data in the new CDMA provisioning data image are copied to the CDMA provisioning data portion of the nonvolatile memory, step 61. Similarly, if the version number of the downloaded UMTS provisioning data is later than the version number of the UMTS provisioning data stored in nonvolatile memory (i.e., test 55="No" indicating that the image is a UMTS image and the UMTS version numbers are not equal), then provisioning data in the new UMTS provisioning data image are copied to the UMTS provisioning data portion of the nonvolatile memory, step 63. If either technology provisioning data image is of the same version number as that stored in nonvolatile memory, then the step of loading the data to nonvolatile memory is not performed. Finally, once the version comparisons have been completed, including loading new provisioning data into nonvolatile memory, the downloaded provisioning data images are deleted from RAM, thereby reclaiming memory space for other applications, step 7. Finally, the transceiver is initialized, step 9, and transceiver software initiated.

The process of downloading a provisioning data image to the transceiver' RAM each time the transceiver is energized does not add significantly to system overhead or start up delay since the transceiver operating software needs to be downloaded at the same time. By downloading the provisioning data image at initialization and checking the version numbers be for transceiver initialization, the various embodiment methods ensure that the very latest data image is implemented on the transceiver. By performing this operation before the transceiver is otherwise initialized, the process for updating the transceiver to the latest provisioning data image is accomplished without the need to reboot or re-initialize the transceiver. If an update to a provisioning data image is made off-line (such from a compact disc), the change is detected and the provisioning data in nonvolatile memory is replaced with the latest version before the transceiver contacts the network. If an update is implemented by the carrier sending a new provisioning data image over the air, then the new image is stored on the computer's hard drive, and will be implemented on the transceiver the next time the transceiver is initialized. In some cases, the transceiver may be immediately reinitialized after a new provisioning data image has been downloaded over the air. In this manner, network carriers can update their provisioning data at will and keep cellular network transceivers up-to-date without impacting computer operations.

In embodiments where the provisioning data is encrypted, the steps of writing the downloaded data image to nonvolatile memory, steps 61 and 63, may include decrypting the data prior to storing the data. The decryption keys used for such a process may be stored within nonvolatile memory of the transceiver at the time of manufacture, or may be downloaded or updated subsequently using methods well known in the encryption arts.

In the various embodiments, the provisioning data image may be stored as a record of data including security verification codes, format information, the image version number, and other provisioning data types. An example data structure of the provisioning data image 100 is illustrated in FIG. 4.

The provisioning data image 100 may include a security check "magic word" 102 in the first few bytes. As discussed above, the provisioning data image will be verified by the computer or transceiver before it is implemented. One way this may be accomplished is by confirming a security value 102 that is stored in the image itself, such as a magic word. Alternatively, the security check value 102 may be a hash of the entire data image or of a portion of the data image 100. In a particular embodiment, the security check value 102 includes the signature applied by the authenticating agency at the time the provisioning data image 100 is prepared for distribution.

The provisioning data image 100 may also include a value defining the data format version 104 which the transceiver can use to determine the type of the data in the data structure. Using this information, the transceiver can know which fields contain data that need to be loaded to nonvolatile memory and use in the operation of the transceiver.

As discussed above, the provisioning data image 100 includes an image version number 110 that is used to determine whether new data needs to be loaded to nonvolatile memory.

The provisioning data image 100 includes the provisioning information 106, 112 to be loaded to nonvolatile memory, as well as spare data fields which may be used in later versions. This provisioning data may be the only part of the provisioning data image that is stored to nonvolatile memory to support operations of the transceiver. Thus in some embodiments, the provisioning data image 100 may be parsed in order to obtain the provisioning data 106, 112 before a data is stored in nonvolatile memory. Similarly, the version number 110 may be extracted from the provisioning data image 104 storage in nonvolatile memory.

FIG. 5 illustrates an example of the image version number 110 that may be included within the provisioning data image 100. As illustrated, the version number 110 may include a first field for indicating the technology type 110*a*. For example, the CDMA image type may be indicated with a first value, while UMTS technology type data may be indicated with a second value. The version number 110 may also include a cellular carrier 110*b* which indicates the particular carrier associated with the provisioning data image. In this manner, the version number can be used to determine the particular carrier for which the data is appropriate. Also, the transceiver can determine that a change in carrier is indicated by a change in the provisioning data image version number even if the two carriers have the same version number for their provisioning data for the same technology. Since the carrier ID value is changed, the transceiver is informed that a change in provisioning data is necessary or that the carrier is changed. Finally, the version number 110 may include a serial or date stamp version value 110*c* unique to the particular version of the provisioning data image.

FIG. 5 illustrates but one example of a version number data structure that may be implemented. A variety of other structures may be used, as well as additional fields of information that may be included within the value.

Carriers may be identified in the provisioning data images and version numbers with a simple value or carrier ID. The carrier ID then can be saved in the computer's system configuration file to indicate which of the provisioning data image files should be loaded as part of the transceiver initialization process. Such a carrier ID may be a simple digital value or code assigned to individual carriers, or even the carriers company name.

Figure 6:
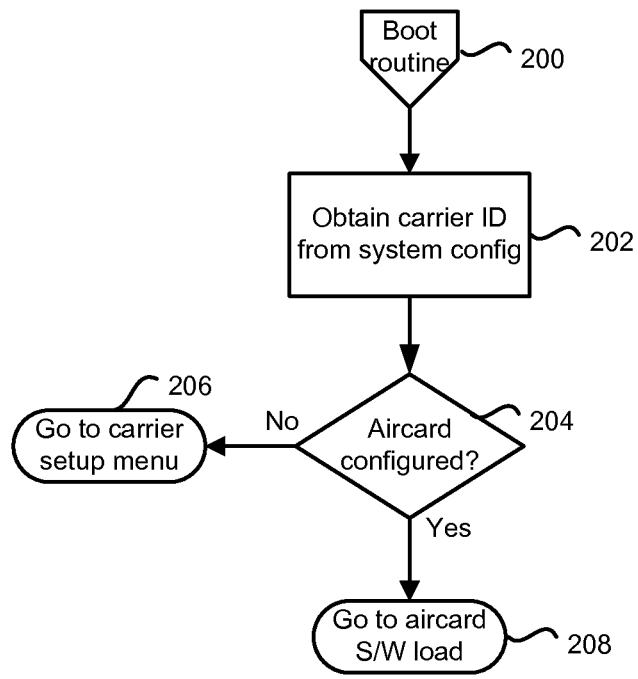
FIG. 6 is a process flow diagram of a routine for initializing the carrier setup menu according to an embodiment.
Figure 7:
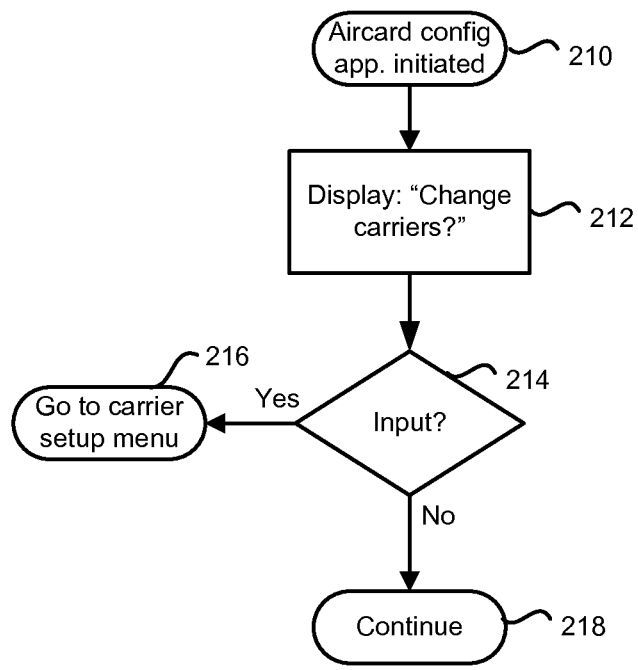
FIG. 7 is a process flow diagram of a routine for initializing the carrier setup menu in response to a user selection according to an embodiment.
Figure 8:
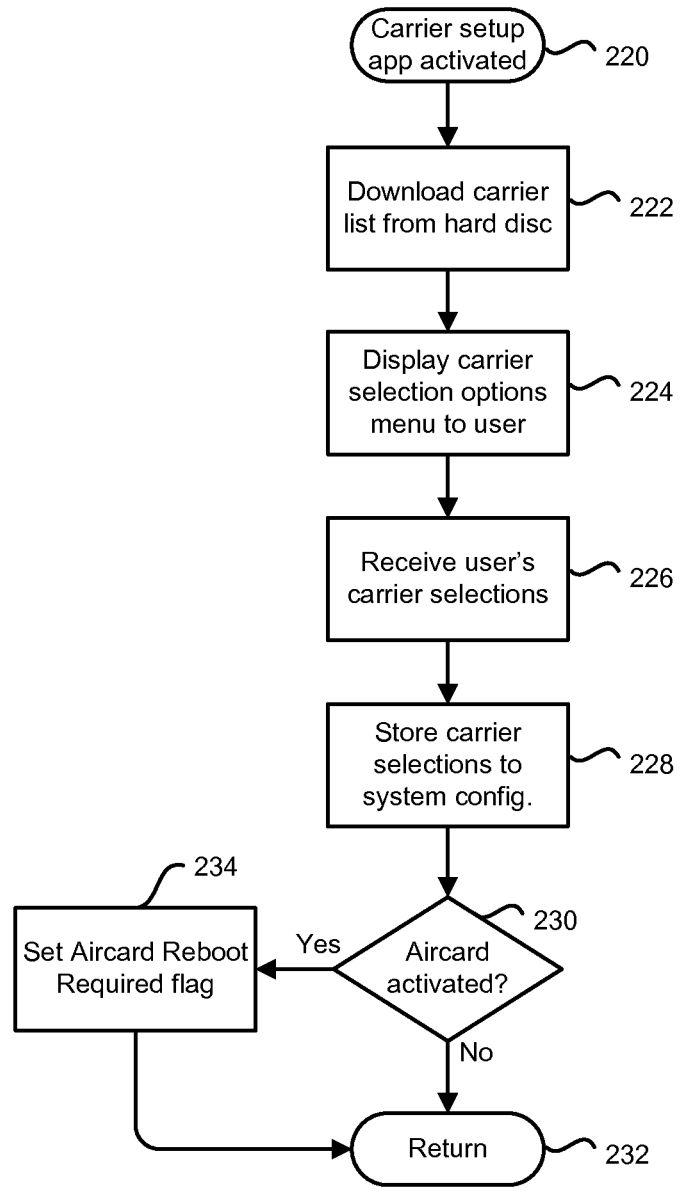
FIG. 8 is a process flow diagram of a carrier setup menu routine according to an embodiment.

FIGS. 6-8 illustrate software methods that may be implemented to enable users to select cellular carriers and load the associated provisioning data images. FIG. 6 illustrates a portion of the software routine that may be implemented the first time that a user activates a cellular network transceiver. As part of an initializing boot routine, step 200, the computer or the cellular network transceiver may access the carrier ID information saved in the computer's system configuration, step 202. The returned carrier ID may be tested in step 204 to determine if the transceiver has been configured. If there is no information saved in the carrier ID field of the system configuration file, this would indicate that the transceiver has not yet been configured prompting the computer to implement the carrier setup menu, step 206. The carrier setup menu process is described below with reference to FIG. 8. The computer system configuration may be preloaded with a value that indicates that the cellular network transceiver card has not been configured, such as a "0000" value. If the return value from the system configuration indicates that the transceiver has been configured, then the process may continue to the software and the provisioning data image loading process, step 208, such as described above with reference to FIG. 3.

FIG. 7 illustrates a portion of a software routine that may be used to change operational parameters of a cellular network transceiver. This routine may be part of a software application provided to enable a user to configure various settings of the cellular network transceiver. After the transceiver configuration application is initiated, step 210, a menu display may be generated to inquire whether the user would like to change cellular carriers, step 212. The input received in response to this menu is tested, step 214, to determine if the application should initiate the carrier setup menu, step 216, indicated by a "yes" input. The carrier setup menu process is described below with reference to FIG. 8. If the user input indicates that the carrier is not to be changed, then the configuration application may continue to provide other options, step 218.

FIG. 8 illustrates some steps that may be implemented to provide a user with menu options for changing cellular carriers used for the cellular network transceiver. When the menu is activated, step 220, such as described above with reference to FIG. 6 and FIG. 7, the computer or the transceiver downloads a list of carriers for which there is provisioning data stored on the hard disk, step 222. Using this information, the computer can display a menu of cellular carriers and technology options, step 224. This menu of options may include a variety of choices that cellular carriers offer to users. For example, in addition to giving the user a choice of selecting a particular carrier for a particular technology (e.g., CDMA or UMTS), carriers may provide users with a choice of service plans which may have specific provisioning data images. It is envisioned that this menu of carrier options may be set by carriers and manufacturers. The various embodiments provide flexibility for loading a variety of provisioning data images to enable a wide range of different cellular carrier service options.

A user then may respond to the menu of carrier options by selecting a particular carrier and/or carrier service option which is received by the computer, step 226. As noted above, the user may select multiple carrier service plans, such as one for each type of cellular technology. In many implementations provisioning items are unique to a particular technology. For example, the feature flags and NV items do not overlap (i.e., the provisioning data are disjoint) between CDMA 2000 and UMTS technologies. Hence it is possible to maintain an active subscription per technology in such cases. Stored carrier service selections, in particular the associated carrier, can be stored to the computer's system configuration, step 228. Prior to storing the carrier IDs in the system configuration, the menu may ask the user to confirm that a change to the system configuration is desired. Additionally, the computer may save a backup of the previous system configuration to enable a rapid restore in case the system is unable to operate after the change (e.g., if the carrier ID is associated with an inoperable provisioning data image).

Some users may want to maintain multiple subscriptions in a single technology, enabling them to switch carriers without switching technology (e.g., CDMA or UMTS). In such cases, multiple copies of subscription provisioning information may be maintained in the nonvolatile memory, so that only the carrier-specific nonvolatile provisioning items are updated when the user switches between carriers. This approach enables users to switch carriers easily while optimizing nonvolatile memory usage.

The computer (or the transceiver itself) may then determine whether the transceiver has previously been activated, step 230. If the transceiver has already been activated, i.e. the user is in the process of switching carriers, then a flag or other symbol may be set to indicate that any reboot or re-initialization of the cellular network transceiver is required, step 234, before the menu application continues, step 232. By setting a flag to indicate that a transceiver reboot or reinitialization is necessary, the menu application can continue (with step 232) so that other transceiver setting changes can be made before the transceiver is reinitialized. If the transceiver has not been previously activated (i.e., step 230="no"), then the transceiver set up menu application can continue since initialization of the transceiver will take place at the conclusion of the menu application, step 232.

Figure 9:
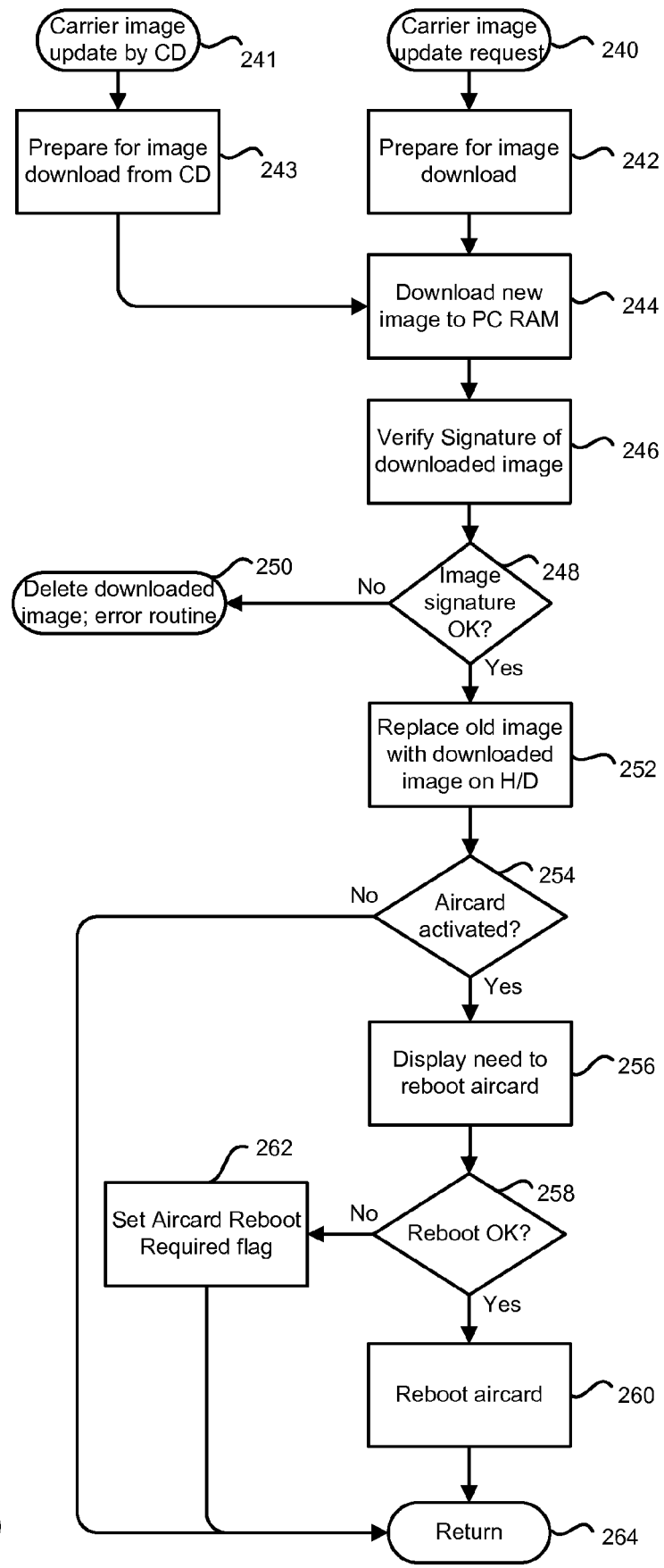
FIG. 9 is a process flow diagram of a method for updating cellular network transceiver provisioning information according to an embodiment.

FIG. 9 illustrates an example of method steps that may be implemented to update a provisioning data image loaded on the computer's hard drive and in the transceiver's nonvolatile memory. Updates to provisioning data images may be accomplished over the air upon an initiative of the carrier, step 240, or by means of a tangible storage medium, step 241.

During cellular data communications, if the cellular carrier decides to update the provisioning data it can do so by sending a message via the cellular data network to the transceiver requesting that an image update process be initiated, step 240. As noted herein, the carrier may determine that the provisioning data image implemented on any newly initiated transceiver requires updating when the transceiver reports its version number to the carrier, or when the carrier revises its provisioning data. Upon receiving such a message from a carrier via the transceiver, the computer may prepare to receive the new provisioning data image via the cellular network, step 242. This step may include establishing a buffer in memory to receive the downloaded data image. This step may also include verifying that the particular carrier is authorized to download provisioning data image updates over the air, such as by checking security and configuration settings stored in the system configuration or transceiver configuration. The computer may also initiate an encrypted communication link with the carrier to receive the new provisioning data image. The computer then can download the new provisioning data image and store the information in random access memory or in a temporary location on the computer's hard drive, step 244.

Before the computer updates its record of provisioning data images, the downloaded provisioning data image may be verified to confirm that it is complete, accurate, and has been certified by a software authenticating agency, step 246. This may be accomplished by verifying a digital signature attached to the provisioning data image by an authenticating agency, as is well known in the encryption and cellular technology arts. As mentioned above, this may be accomplished by computing a hash of the downloaded provisioning data image using a private encryption key known to the computer or the transceiver, followed by comparing the resulting hash to the signature value appended to the provisioning data image. If the signature of the downloaded image is not validated, the downloaded provisioning data image may be deleted from memory and an error routine initiated, step 250. On the other hand, if the digital signature is verified, the computer may replace the provisioning data image stored on the hard disk with the new provisioning data image, step 252. This ensures that the data image associated with a particular carrier ID stored on the hard drive is of the latest version.

The computer or transceiver may then determine whether the transceiver has previously been activated, step 254. If not, then a reinitialization of the transceiver is not required and the application may return control to the previous process, step 264, since activation of the transceiver will result in loading of the provisioning data image. (It is noted that this process path may not occur in normal operations in some implementations.) If the transceiver has been previously activated (i.e., step 254="yes"), the computer may display a notification to the user that the transceiver needs to rebooted or reinitialize, step 256. This display may give the user an option to allowing reinitialization to occur immediately or be delayed such as may be appropriate if the user is in the middle of another operation. If the user's input, step 258, indicates that a reboot or reinitialization of the transceiver should not be immediately performed, a flag may be set in memory, step 262, to indicate that reboot or reinitialization of the transceiver is required. This flag then can be used to initiate the transceiver reboot or reinitialization at a later time. If the user opts for immediate reboot or reinitialization of the transceiver, then that process may then be accomplished, step 260. An example transceiver initialization process is described above with reference to FIG. 3. Once reinitialization of the transceiver is completed, the computer may return to the previously ongoing process, step 264.

In a further embodiment, a mechanism is provided for restoring factory default values in the field or during initial manufacturing of the transceiver card. Restoring the factory default values in the field can be used to either recover a faulty card or to reset the card to a known good state prior to activation by the carrier. For this embodiment, the provisioning data image version field stored in nonvolatile memory is set to a particular bitmask or value in addition to the carrier provisioning data image version number information. This may be accomplished by a command from the computer interface that sets this value. During boot-up, when the software detects that the provisioning data image version number in nonvolatile memory has this special bitmask or value, the software processes through a list of provisioning items to update for the particular implementation and force loads these items to the non-volatile memory, thereby ensuring a factory load state. This can be done once after which the bitmask is reset, thereby restoring the original carrier image version number. The same approach can also be used in the factory for initial setting of carrier-specific provisioning data. This embodiment facilitates production at the factory enabling provisioning to be accomplished in a fast and consistent manner, while making the management of special provisioning data settings transparent in the factory.

An update to stored provisioning data images may also be accomplished by tangible medium such as by the user inserting a compact disc (CD) into the computer's CD player, step 241. This may occur when the user loads a new software application associated with a particular cellular carrier. For example, if a user is selecting a new carrier which provides carrier specific transceiver operating software, that application may be provided on a CD and include updated provisioning data images. If the computer detects that the tangible medium includes updated provisioning data images, the computer may prepare to download those images, step 243. The step may include preparing to receive the downloaded images, such as establishing temporary memory space in RAM or on the hard drive to receive the data. It may also include confirming that the carrier is authorized to provide provisioning data image updates via the particular type of tangible medium. Additionally, the process may include verifying signatures on the tangible medium to confirm that the medium was provided by the indicated carrier.

Once the computer has prepared to receive the new provisioning data images from the tangible medium, a computer can proceed to download the images to memory and process the downloaded information in a manner described above with reference to steps 244 through 264.

Figure 10:
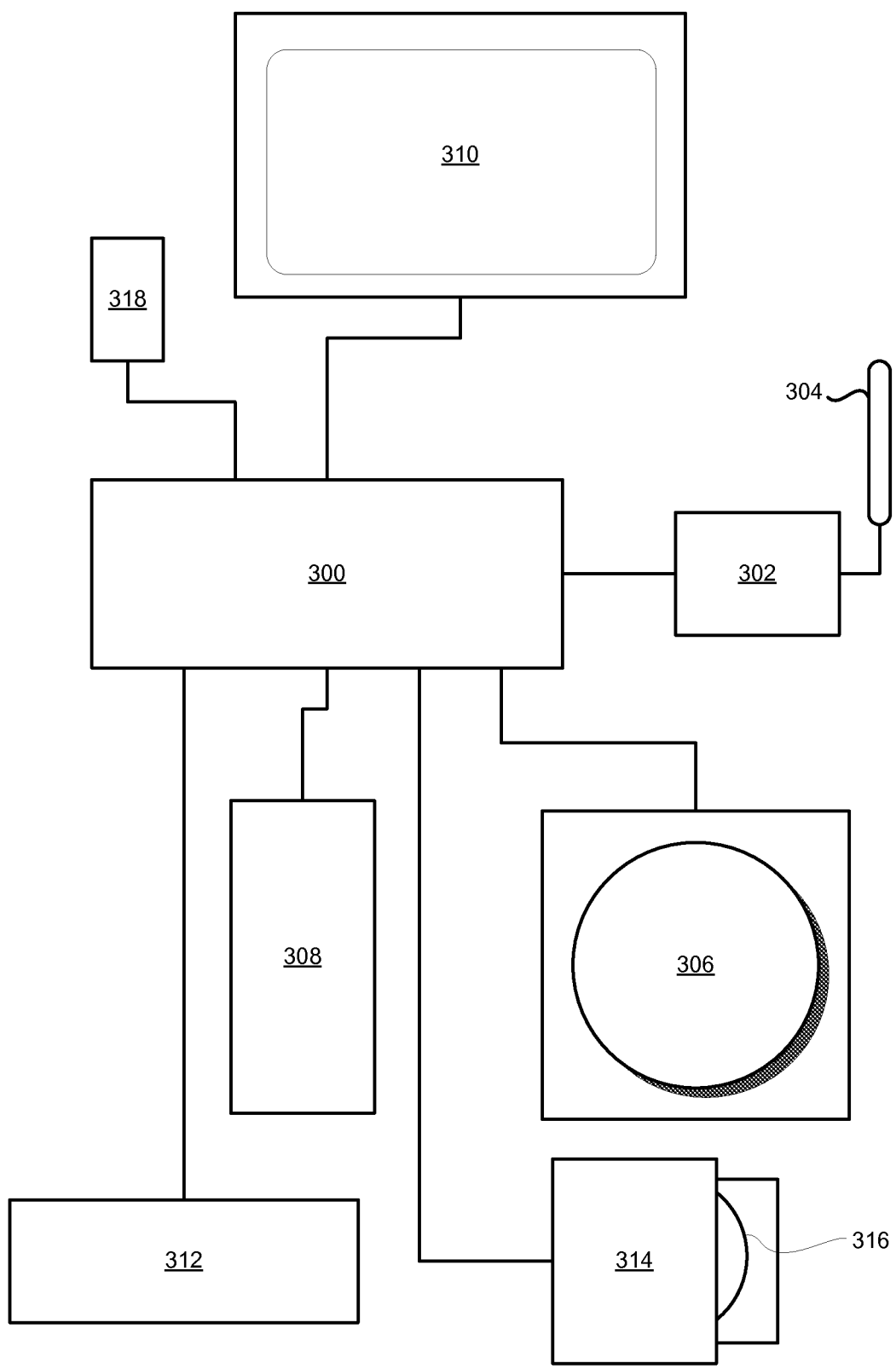
FIG. 10 is a component block diagram of a laptop computer including a cellular network transceiver.
Figure 11:
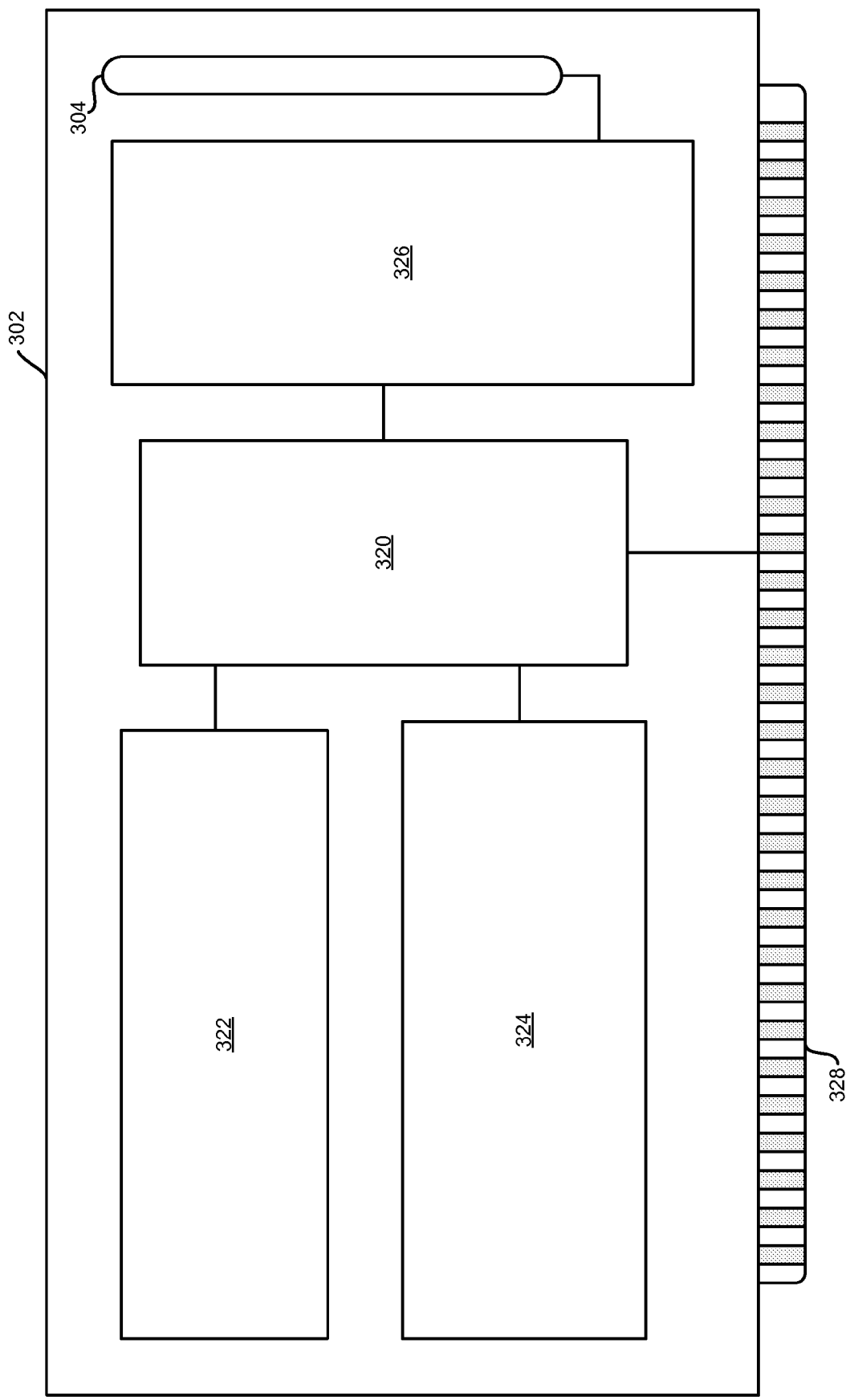
FIG. 11 is a component block diagram of an example cellular network transceiver.

FIG. 10 illustrates various component elements of a typical computer system implementing the various embodiments. Typical computer includes a microprocessor 300 which is coupled to the cellular network transceiver 302. The transceiver 302, which is described in more detail below with reference to FIG. 11, is coupled to an antenna 304 through which the transceiver is able to transmit and receive cellular data communications with a carrier's network. The computer also includes a hard disk 306 coupled to the microprocessor 300 for storing large mounds of data and software applications. Random access memory 308 coupled to the microprocessor 300 may store software instructions and dated used by the processor in performing various applications. Typical computers also include a display 310 and user input devices such as a keyboard 312 coupled to the microprocessor 300. Typical computers also include tangible media readers, such as a CD player 314 coupled to the microprocessor 300 for playing compact discs 316. Also, computers typically include network connections 318, such as Ethernet connectors, wireless network transceivers, infrared transceivers, and other known network interfaces.

An example of a cellular network transceiver 302 is illustrated in FIG. 11. This transceiver 302 is illustrated as a separate transceiver card, but may be implemented as a large integrated circuit or chipset mounted on the computer's motherboard. The transceiver trio two may include 80 processor 320 coupled to input and output leads 328 for connecting to the computer's microprocessor 300. Such a processor 320 may be any of a variety of microprocessors or microcomputers capable of performing software instructions. The transceiver 302 may also include random access memory (RAM) 322 and nonvolatile memory 324 coupled to the processor 320. The RAM 322 may be used to store application data used by the transceiver processor 320 as well as temporarily holding provisioning data image is before they are loaded to nonvolatile memory 324. The nonvolatile memory 324 may be any of a variety of nonvolatile memory chips, such as flash memory. Nonvolatile memory 324 may be used to store provisioning data and application software used to configure the transceiver processor 320.

Coupled to the transceivers processor 320 it will be a radio transceiver and modem circuit 326. The radio transceiver and modem circuit 326 includes RF transceiver circuitry necessary for sending and receiving radio frequency signals to/from a carrier network. The radio transceiver and modem circuit 326 also includes modem circuitry configured to encode digital data into radio frequency signals for transmission, and translate received radio frequency signals into digital data that can be interpreted by the transceiver processor 320 and/or the computer microprocessor 300. RF transceiver circuitry and modem circuitry are well known in the telecommunications and cellular technology arts, and therefore require no further description herein. In some configurations, the transceiver 302 may include the antenna 304 as part of the same card as illustrated in FIG. 11. Alternatively, the transceiver 326 may be connected to an antenna 304 that is positioned at a different location within the computer.

The various embodiments may be implemented by the computer microprocessor 300 and/or transceiver processor 320 executing software instructions configured to implement one or more of the described methods. Such software instructions may be stored in memory 306, 322, 324 as compiled software implementing an embodiment method. Further, the software instructions may be stored on any form of tangible processor-readable memory, including: random access memory 308, 324 module, read only memory 322; an external memory chip such as a USB-connectable external memory (e.g., a "flash drive"), including external memory provided as part of the ad external device; hard disk memory device 306; a floppy disc (not shown); and a compact disc 316.

Those of skill in the art would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in processor readable memory which may be any of RAM memory, flash memory, ROM memory, EPROM memory, EEPROM memory, registers, hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal or mobile device. Additionally, in some aspects, the steps and/or actions of a method or algorithm may reside as one or any combination or set of codes and/or instructions on a machine readable medium and/or computer readable medium, which may be incorporated into a computer program product.

The various embodiments offer a number of advantages over the prior art. The embodiments enable input and output data to be moved between a calling (i.e., client) process and a called (i.e., server) process with a single copy, without incurring the limitations, complexity and additional overhead typical in previous system. For example, in the embodiments, a server process does not need to predict the size and/or location of data inputs. Further, the server process does not need to retain a copy of the output data after returning to the calling process. Also, the server process does not need to have enough memory to hold all the input or output arguments in memory at the same time. For a large class of functions, the various embodiments reduce the data movement overhead of a microkernel architecture to zero, because the process-to-process copy can overlap copies that are implicit in the remoted function. For example, when reading from a data block, the copy into the client process can move the memory from the file system cache to the client process buffer. Since this copy is implied by the remoted "read" function, it would be required even when the caller resides in the same process.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

What is claimed is:

1. A method for provisioning a cellular network transceiver installed in a computer system including a hard disk memory, comprising:
   downloading from the hard disk memory to random access memory of the cellular network transceiver a provisioning data image associated with a particular cellular carrier;
   obtaining a first version number from the downloaded provisioning data image;
   comparing the first version number of the downloaded provisioning data image with a second version number of provisioning data stored in non-volatile memory of the cellular network transceiver;
   storing the downloaded provisioning data image and the first version number to the nonvolatile memory of the cellular network transceiver if the comparison of the first and second version numbers indicates that the downloaded provisioning data image is newer than the provisioning data stored in the nonvolatile memory; and
   deleting the downloaded provisioning data image from the random access memory of the cellular network transceiver.

2. The method of claim 1, further comprising:
   storing a plurality of provisioning data images on the hard disk memory prior to delivery of the computer to a consumer.

3. The method of claim 2, further comprising:
   enabling a user to select the particular cellular carrier from a plurality of cellular carriers; and
   storing the user's selection on the computer's hard disk memory.

4. The method of claim 1, further comprising:
   downloading a replacement provisioning data image from the cellular carrier;
   verifying a digital signature associated with the replacement provisioning data image;
   storing the replacement provisioning data image on the hard disk if the digital signature is verified; and
   reinitializing the cellular network transceiver.

5. A computer system, comprising:
   a first processor;
   a cellular network transceiver coupled to the first processor, the cellular network transceiver comprising:
      a second processor;
      a radio frequency (RF) transceiver circuit coupled to the second processor;
      a nonvolatile memory coupled to the second processor; and
      a random access memory coupled to the second processor; and
   a hard disk memory coupled to the first processor, the hard disk memory having stored thereon at least one provisioning data image configured to enable the cellular network transceiver to access a cellular network,
   wherein:
      the first processor is configured with software instructions to perform operations comprising downloading from the hard disk memory to the random access memory of the cellular network transceiver a provisioning data image associated with a particular cellular carrier; and
      the second processor is configured with software instructions to perform operations comprising:
         obtaining a first version number from the downloaded provisioning data image;
         comparing the first version number of the downloaded provisioning data image with a second version number of provisioning data stored in nonvolatile memory of the cellular network transceiver;
         storing the downloaded provisioning data image and the first version number to the nonvolatile memory of the cellular network transceiver if the comparison of the first and second version numbers indicates that the downloaded provisioning data image is newer than the provisioning data stored in the nonvolatile memory; and
         deleting the downloaded provisioning data image from the random access memory of the cellular network transceiver.

6. The computer system of claim 5, wherein the hard disk memory has stored thereon a plurality of provisioning data images configured to enable the cellular network transceiver to access cellular networks of a plurality of carriers.

7. The computer system of claim 6, wherein the first processor is configured with software instructions to further perform operations comprising:
  enabling a user to select the particular cellular carrier from a plurality of cellular carriers; and
  storing the user's selection on the computer's hard disk memory.

8. The computer system of claim 5, wherein the first processor is configured with software instructions to further perform operations comprising:
  downloading a replacement provisioning data image from a cellular carrier;
  verifying a digital signature associated with the replacement provisioning data image;
  storing the replacement provisioning data image on the hard disk memory if the digital signature is verified; and
  reinitializing the cellular network transceiver.

9. A computer system, comprising:
  a hard disk memory;
  a cellular network transceiver having a random access memory and a nonvolatile memory;
  means for downloading from the hard disk memory to the random access memory of the cellular network transceiver a provisioning data image associated with a particular cellular carrier;
  means for obtaining a first version number from the downloaded provisioning data image;
  means for comparing the first version number of the downloaded provisioning data image with a second version number of provisioning data stored in the non-volatile memory of the cellular network transceiver;
  means storing the downloaded provisioning data image and the first version number to the nonvolatile memory of the cellular network transceiver if the comparison of the first and second version numbers indicates that the downloaded provisioning data image is newer than the provisioning data stored in the nonvolatile memory; and
  means for deleting the downloaded provisioning data image from the random access memory of the cellular network transceiver.

10. The computer system of claim 9, further comprising:
  means for storing a plurality of provisioning data images on the hard disk memory prior to delivery of the computer to a consumer.

11. The computer system of claim 10, further comprising:
  means for enabling a user to select the particular cellular carrier from a plurality of cellular carriers; and
  means for storing the user's selection on the computer's hard disk memory.

12. The computer system of claim 9, further comprising:
  means for downloading a replacement provisioning data image from the cellular carrier;
  means for verifying a digital signature associated with the replacement provisioning data image;
  means for storing the replacement provisioning data image on the hard disk if the digital signature is verified; and
  means for reinitializing the cellular network transceiver.

13. A cellular network transceiver configured to be installed in a computer, comprising:
  a processor;
  a radio frequency transceiver circuit couple to the processor and configured to send and receive signals to/from a cellular network;
  a random access memory coupled to the processor;
  a nonvolatile memory coupled to the processor; and
  connectors coupled to the processor and configured to electronically couple the cellular network transceiver to the computer,
  wherein the processor is configured with software instructions to perform operations comprising:
    downloading from a hard disk memory to the random access memory of the cellular network transceiver a provisioning data image associated with a particular cellular carrier;
    obtaining a first version number of the downloaded provisioning data image store in the random access memory;
    comparing the first version number to a second version number stored in the nonvolatile memory indicative of a version of provisioning data stored in the nonvolatile memory;
    storing provisioning data obtain from the downloaded provisioning data image in the nonvolatile memory if the comparison of the first and second version numbers indicates that the downloaded provisioning data image is of a newer version than the provisioning data stored in the nonvolatile memory; and
    deleting the downloaded provisioning data image from the random access memory.

14. A cellular network transceiver configured to be installed in a computer, comprising:
  a processor;
  means for sending signals to and receive signals from a cellular network;
  a random access memory coupled to the processor;
  a nonvolatile memory coupled to the processor;
  means for coupling connectors to the processor and electronically configuring the connectors to couple the cellular network transceiver to the computer;
  means for downloading from a nonvolatile memory to the random access memory of the cellular network transceiver a provisioning data image associated with a particular cellular carrier;
  means for obtaining a first version number of the downloaded provisioning data image stored in the random access memory;
  means for comparing the first version number to a second version number stored in the nonvolatile memory indicative of a version of provisioning data stored in the nonvolatile memory;
  means for storing provisioning data obtain from the downloaded provisioning data image in the nonvolatile memory if the comparison of the first and second version numbers indicates that the downloaded provisioning data image is of a newer version than the provisioning data stored in the nonvolatile memory; and
  means for deleting the downloaded provisioning data image from the random access memory.

15. A non-transitory processor-readable storage medium having stored therein processor executable software instructions configured to cause a processor to perform operations comprising:
  downloading from a hard disk memory into random access memory of a cellular network transceiver a provisioning data image associated with a particular cellular carrier;
  obtaining a first version number from the downloaded provisioning data image;
  comparing the first version number of the downloaded provisioning data image with a second version number of provisioning data stored in non-volatile memory of the cellular network transceiver;

storing the downloaded provisioning data image and the first version number to nonvolatile memory of the cellular network transceiver if the comparison of the first and second version numbers indicates that the downloaded provisioning data image is newer than the provisioning data stored in the nonvolatile memory; and deleting the downloaded provisioning data image from the random access memory of the cellular network transceiver.

* * * * *